United States Patent [19]

Oldenkamp et al.

[11] 4,300,042
[45] Nov. 10, 1981

[54] MAGNETIC STRIPE CARD AUTHOR

[75] Inventors: Ralph J. Oldenkamp, Oakland; Frederic D. Weekes, Berkeley, both of Calif.

[73] Assignee: Vendacopy, Inc., Foster City, Calif.

[21] Appl. No.: 138,390

[22] Filed: Apr. 8, 1980

[51] Int. Cl.³ .............................. G06K 7/08; G06F 7/38
[52] U.S. Cl. .............................. 235/449; 235/92 AC; 340/825.35; 340/825.15
[58] Field of Search .......... 235/449, 382, 430, 92 AC, 235/92 FP; 364/406; 340/149 A

[56] References Cited

U.S. PATENT DOCUMENTS

| | | | |
|---|---|---|---|
| 3,917,924 | 11/1975 | Linne | 235/92 AC |
| 3,935,933 | 2/1976 | Tanaka et al. | 340/149 A |
| 4,007,355 | 2/1977 | Moreno | 340/149 A |
| 4,068,213 | 1/1978 | Nakamura et al. | 340/149 A |
| 4,216,461 | 8/1980 | Werth et al. | 235/92 AC |
| 4,228,348 | 10/1980 | Lee | 235/449 |

Primary Examiner—Donald J. Yusko
Attorney, Agent, or Firm—Townsend and Townsend

[57] ABSTRACT

Method and apparatus for registering selected new magnetic data on magnetic stripe cards for use in a vending machine account control system, such as is employed with a photocopy machine. Specifically, card author is provided which consists of a keyboard with data entry and operation control keys, keyboard scanning means, an input/output storage port and a bus connector which can be coupled directly to a duplicator controller. Upon connection of the card author to the duplicator controller, and with the duplicator controller in a card author mode, the duplicator controller initiates interactive operation with the card author in order to request certain information not normally accessible to manual manipulation as by a key operator. Through its display, the duplicator controller requests entry of at least three different types of values, a value representing worth of a card to be authored, an account number, and a delimiter value. The delimiter value restricts field of use to specific machines and time periods and may be an expiration date, a department number, a system identification number, or any combination of the above. A specific protocol for use of the card author assures proper encoding of magnetic cards.

7 Claims, 3 Drawing Figures

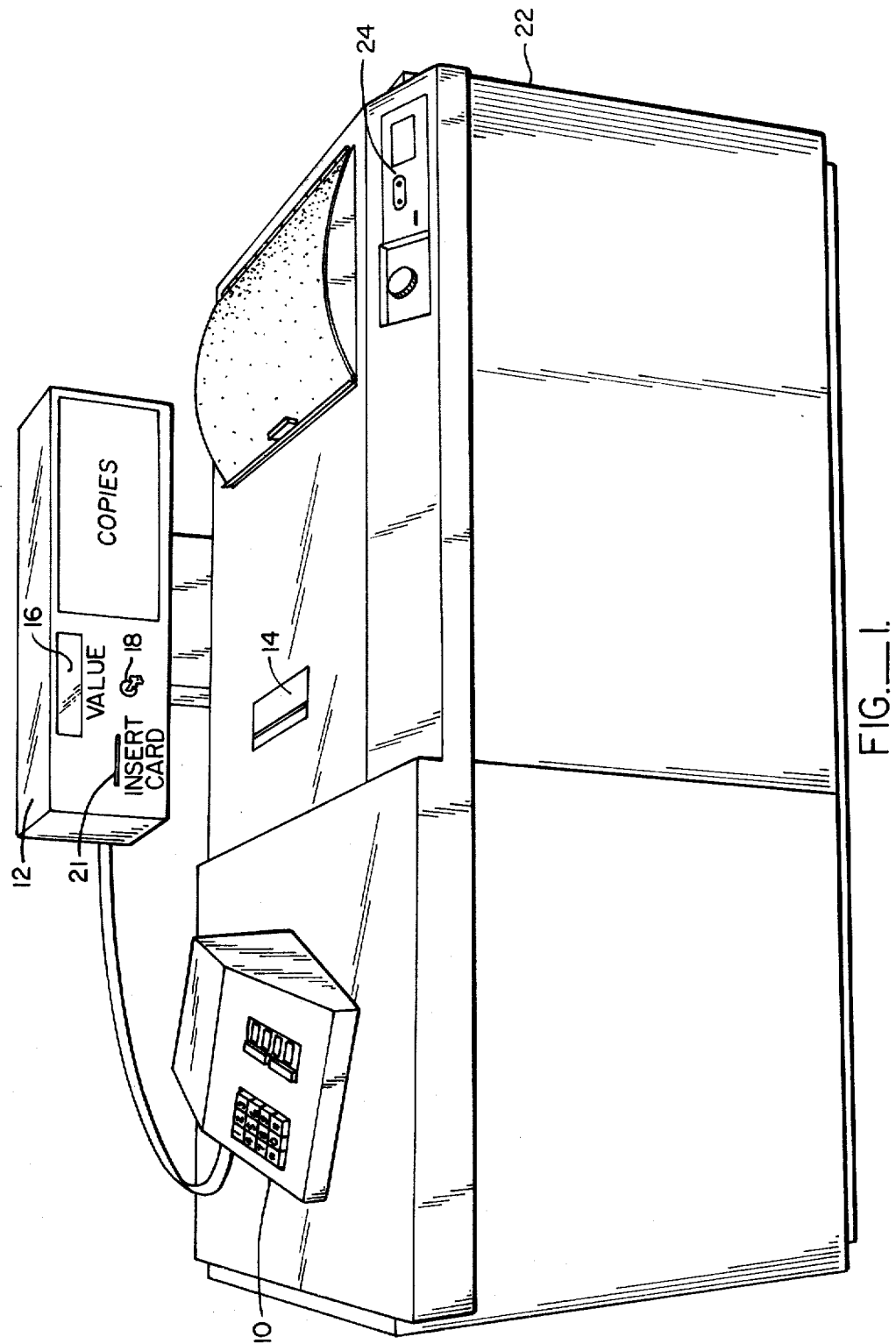
FIG._1.

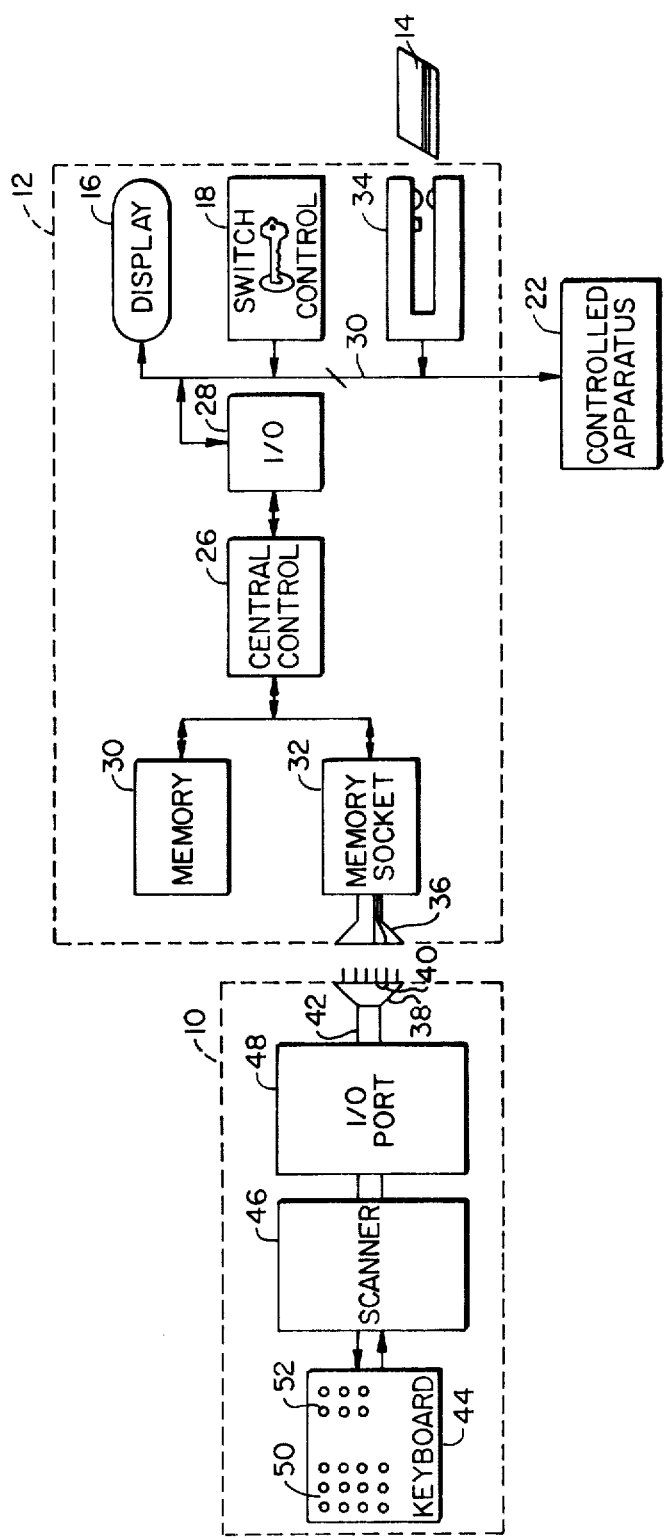
FIG._2.

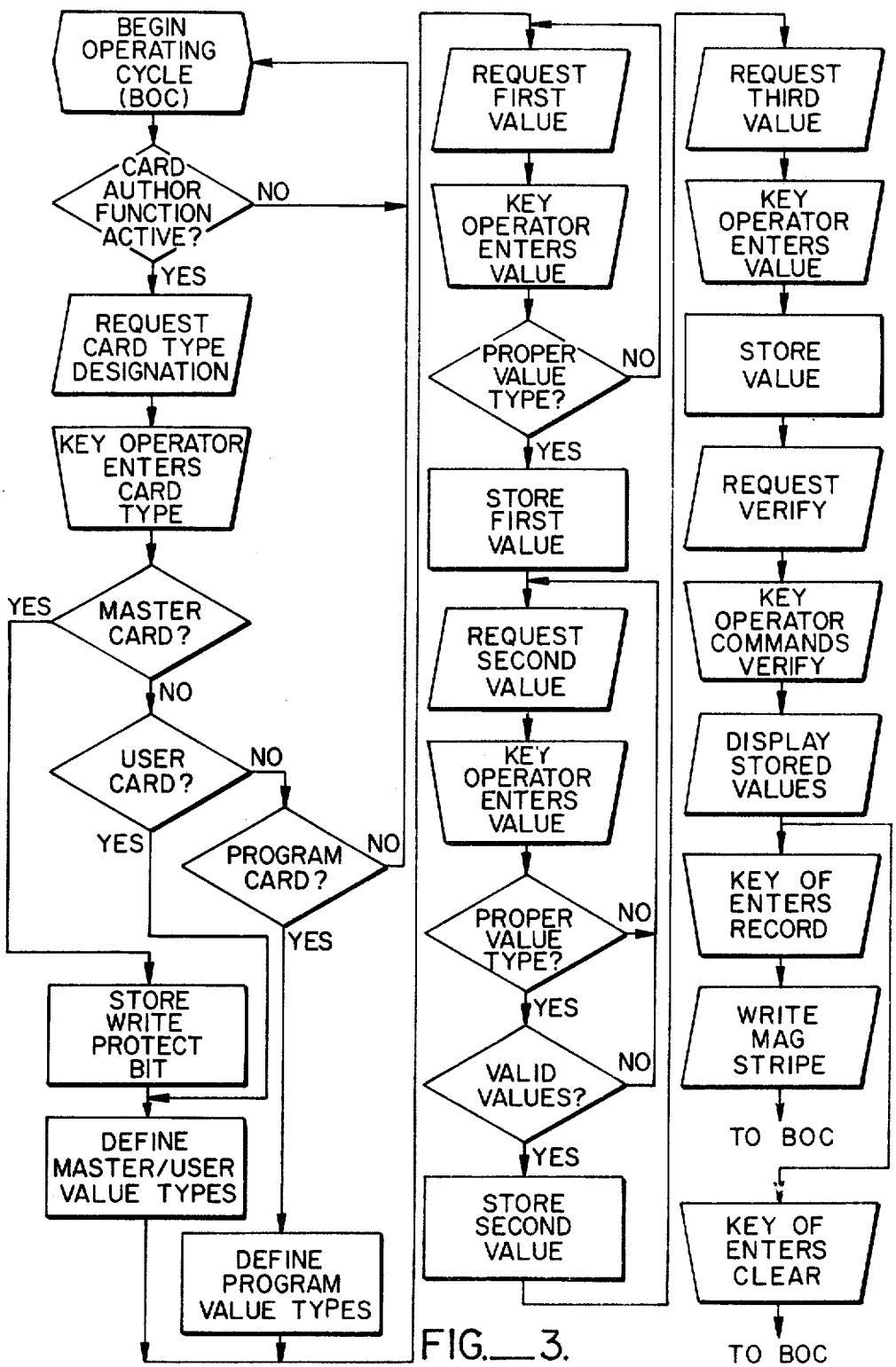
FIG._3.

MAGNETIC STRIPE CARD AUTHOR

BACKGROUND OF THE INVENTION

1. Field of Invention

This invention relates to vending machine account control systems, and particularly relates to use of cards with a magnetically encodeable stripe as a medium of exchange. The invention has particular application to use wth photocopy machines in institutions where exact accounting of machine use is desired without actual exchange of cash. Specifically, the invention relates to method and means for registering fresh accounting information on the magnetic card stripe using a duplication controller on a vending machine so equipped without allowing a normal card user access to the accounting data. A duplication controller, for example, a microcomputer-based duplication controller made by Glendale Manufacturing Corporation of San Mateo, Calif. and distributed through its COPICO vending machine operation, normally has capabilities limited only to automatic generation of information in response to machine operation. In particular, the duplication controller reads the account information on the magnetic stripe of a card inserted therein, activates the vending machine, and then registers on the magnetic stripe information indicating the number of copies or the value chargeable against the card. The card is initially encoded with a maximum amount which the machine replaces with a decremented value depending upon the amount of usage.

The operation of the machine calls for the card user to be issued or to purchase a card having a magnetic stripe with encoded information. Typically, the cards are encoded in standard amounts at the factory. Spent cards are returned to the factory for reencoding. At the factory, special equipment used by operators with detailed knowledge of the encoding equipment and encoding scheme are employed to encode or "author" usable cards.

What is needed is an apparatus which is capable of acting as a complete system for authoring new cards in conjunction with a duplicator controller. In this manner a key operator or central office at an institution can author cards for internal bookkeeping purposes without allowing normal card users unauthorized access and control of card functions but without the need to return the cards to the factory. The method of use must be such as to be functional without detailed knowledge of the system operation.

2. Description of the Prior Art

Magnetic stripe card vending machine control systems are known in public transit operations such as the Bay Area Rapid Transit District (BART). The BART ticket system employs a coin-operated card dispenser and a separate fare box. The machinery is relatively large and cumbersome and does not have the capability to author cards in the environment of an institution or with the special limitations and needs of an institution such as a university, a large office, or a company, where cash, coins, and counter-freed devices are not suited to internal bookkeeping.

Numerous inventions relate to automatic fare collection systems. A representative patent in U.S. Pat. No. 4,068,213 which describes a credit card reader for use in a retail store. Other patents of interest include U.S. Pat. Nos. 3,939,933; 3,989,930; 4,024,379; 3,748,441; 3,602,695; and 3,356,021.

Inventions are also known for devices for issuing magnetic stripe cards having a predetermined monetary value. A representative patent describing such an invention is U.S. Pat. No. 3,984,660.

SUMMARY OF THE INVENTION

According to the invention, method and apparatus are provided for registering selected new magnetic data on magnetic stripe cards for use in a vending machine account control system, such as is employed with a photocopy machine. A card author is provided which consists of a keyboard with data entry and operation control keys, keyboard scanning means, an input/output storage port and a bus connector which can be coupled directly to a duplicator controller. The duplicator controller includes accounting functions which are not normally accessible to manual manipulation. The duplicator controller has means for sensing the connection of a card author thereto such that its operations can be modified by manual operation of the card author. Upon connection of the card author to the duplicator controller, and with the duplicator controller in a card author mode, the duplicator controller initiates interactive operation with the card author in order to request certain information. Through its display, the duplicator controller requests entry of at least three different types of values, a number representing worth of a card to be authored, an account number, and a field of use delimiter value. The field of use delimiter value may be an expiration date, a department number, a system identification number, or any combination of the above. Specifically, the duplicator controller requests the first value, whereupon the operator registers the first value on the keyboard, commands the value to be entered into the card author where it is stored in a memory location. The card author then requests the second value, whereupon the operator registers the second value on the keyboard and commands its entry into the duplicator controller, which stores it in a second memory location. The card author then request the third value, whereupon the operator registers the third value on the keyboard and commands its entry into the duplicator controller, which stores it in a third memory location. The duplicator controller then repeats the three values through its display, and then transfers the three numbers to a buffer memory. A magnetic card, having been placed in the card reader/writer, is then encoded with magnetic representations of the digital values.

One of the primary objects of the invention is to provide a card author which operates in combination with a card duplicator controller to assist a key operator in registering desired accounting information on a magnetic card without pemitting a normal card user access to accounting information. Particularly, one of the objects of the invention is to provide a technique whereby the key operator is prompted for proper operation of the card author.

Further objects and advantages of this invention will be apparent upon reference to the following detailed description taken in conjunction with the accompanying drawings.

BRIEF DESCRIPTION OF THE DRAWINGS

FIG. 1 is a pictorial representation of a photocopy vending machine with a card author according to the invention.

FIG. 2 is a block diagram of a vending machine accounting system comprising a duplicator controller and a card author.

FIG. 3 is a flow chart illustrating a specific embodiment of the card author function of the accounting system.

DETAILED DESCRIPTION OF SPECIFIC EMBODIMENTS

A keyboard operated device, herein a card author 10, (FIG. 1), is used in connection with a duplicator controller 12 to register information on magnetic stripe cards 14. A duplicator controller 12 and a card author 10 make up the entire system, and a user having both devices and a sufficient supply of blank magnetic cards 14 can operate a vending machine system independent of the factory.

The duplicator controller 12 has a front panel with a numeric display 16 and a switch control, which includes at least one key-operated switch 18 for selecting modes of operation. In the normal mode of operation with the key removed, the duplicator controller 12 operates in a normal apparatus control mode. A controlled apparatus 22, such as a photocopy machine, is normally actuated by the duplicator controller 12 with the card author 10 upon insertion of a properly encoded card 14 into the duplicator controller card reader 21 and activation of front panel switches 24 on the controlled apparatus 22. The magnetic card is returned to the user after the operating cycle is completed and the encoding on the magnetic card has been updated. There is normally no provision for a user to update information, such as card value.

Referring now to FIG. 2, the duplicator controller 12 comprises a central control unit 26 such as a microprocessor unit, input/output (I/O) means 28, digital memory means 30 and a memory socket 32. The elements 26, 28, 30 and 32 together comprise a single board microcomputer such as a National Type iSBC 80/04 manufactured by Intel Corporation of Santa Clara, Calif.

The I/O means 28 has ports with parallel and serial input and output lines represented generally by a bus 30. A magnetic card reader/writer 34 is coupled to the bus 30. Also coupled to the bus 30 is the switch control 18 and the display 16, as well as the control line of the controlled apparatus 22. The card reader/writer 34 is preferably a constant velocity card reader such as a Sanac Model MCT202 manufactured by Sankyo Seiki Manufacturing Company Limited of Tokyo, Japan. Data are read and encoded serially on a magnetic stripe in preferably an F-2F digital code. The coding is not pertinent to an understanding of the invention.

The memory 30 and memory socket 32 are directly addressable by the central control unit 26. The memory socket 32 is coupled to a back panel jack 36 which can connect to a multiple pin plug 38 of the card author 10. One of the terminals 40 of the plug 38 may be shorted to the ground terminal, thereby to set a bit in the memory socket which can be read by the central control unit 26 to indicate coupling of the card author 10 into the system.

A ribbon cable 42 connects the plug 38 to a console in which the card author keyboard and I/O circuitry are enclosed. The card author circuitry consists of a matrix of keyboard switches 44 coupled to a keyboard scanner 46 which in turn is coupled to an I/O port 48. The I/O 48 interfaces to the ribbon cable 42. The keyboard matrix comprises data switches 50 numbered from 0-9 and control switches 52 with functions such as ENTER, VERIFY, CLEAR, TRANSFER, and specific card identifications such as Master, User and Program Control. The scanner 46 is preferably a National Type MM74C923 keyboard scanner. The I/O port 48 is preferably an eight-bit bidirectional latch which reads the data output of the keyboard scanner and stores that data for input on command to the memory socket 32.

The duplicator controller 12 is preferably the duplicator controller used in connection with the COPICO Brand Model CS2002 copying machine which is manufactured by Glendale Manufacturing Corporation. Since the card author 10 interfaces directly with the central control unit 26 through the memory socket 32, data can be entered to modify other stored data without accessing the input/output means 28. The card author 10 is treated exactly as if it were part of the memory associated with the central control unit 26.

The card author 10 is operable in connection with the duplicator controller 12 only according to a specified protocol. Rather than providing special functions in the card author 10, the control system of the duplicator controller 12 is modified, and these card author control functions are activated only upon connection of the card author 10 to the memory socket 32, as sensed through the terminal 40. While these control functions are generally provided in software, they can also be provided in hardware in the duplicator controller 12. The control functions give external access through the keyboard to the control functions of the duplicator controller 12 which are used in connection with normal user operations. The program functions can be provided in any language suited to supervise operation of the central control unit 26. A flow chart describes the necessary functions.

Turning to FIG. 3, there is shown a flow chart illustrating the method by which the combined system operates in connection with the card author 10. The duplicator controller 12 operates in a recursive cycle. At the beginning of each cycle, the duplicator controller 12 checks to see if the card author function is activated. If not, the duplicator controller 12 executes a normal user cycle in response to other sensed conditions at the I/O means 28. If the card author 10 function is activated, as for example indicated by the sensed line 40, the duplicator controller 12 requests a card type designation through its display, and then it waits for the key operator with the card author 10 to enter on the keyboard of the card author 10 a card type to be authored. Once the key indicating card type has been activated, the duplicator controller 12 asks whether the card type is a master card. A master card is used for duplicating purposes. If it is not a master card, the duplicator controller 12 checks to see whether it is a user card. A user card is distributed to system users for system use. If not, the duplicator controller 12 checks to see whether it is a program type card.

The master card and user card are essentially identical except for the use of a write protect bit in the coding of the master card which prevents erasure. The program card is used by a key operator or vendor to modify parametric data in a system, i.e., to change system configuration such as billing rates.

If the card is a master card, the duplicator controller 12 stores a write protect bit in a portion of memory set aside for output to a card 14 to be recorded. Thereafter, and if the card 14 is a user card, the duplicator controller 12 defines the first value to be read as either a card worth or copy worth. If the card is a program type card, the first value is defined by the system as a first operating parameter. Thereafter, the duplicator controller 12 requests a first value designation by display of a symbol in the display 16, and then it awaits a response. The key operator then registers the first value in the card author 10 and then commands that the first value be entered into the memory 30 of duplicator controller 12 by pressing an ENTER key.

Thereafter, the duplicator controller 12 checks the data to determine if it is the proper type (numerical in a certain range). If not, it returns the system to the beginning of the operating cycle. If the data is proper, the duplicator controller 12 then requests the second value by displaying a code on its display 16 and awaits a response. Thereupon the key operator registers the field of use delimiter value in the card author 10 and commands that it be entered to the duplicator controller 12 by activating the ENTER key. The delimiter is typically a department number, a date, a system identification number, a rate identification number for that particular card, or a combination of all of these. This is a very important bookkeeping function which serves to restrict use of the card 14 to certain machines during limited periods such as a school term in a budget quarter. Upon entry of the delimiter value, the duplicator controller 12 checks the value to determine whether the values are valid, i.e., among a set of preselectable values.

Thereafter, the duplicator controller 12 requests a third value designation through the display 16 and then awaits a response from a key operator. The key operator then registers the third value in the card author 10 and then causes the third number to be entered into the duplicator controller 12 by pressing the ENTER key. The third value is typically the serial number for the card. This number identifies the card, or the series of the card and thereby the user.

Upon entry of the third value, the duplicator controller 12 requests that the key operator verify all of the information by issuing a code to its display. It then waits for a key operator response. The key operator may then press the VERIFY command. The VERIFY command causes the duplicator controller to repeat back all of the values in sequence, and then the machine waits for further commands. The key operator may then press the CLEAR key to clear all of the data and restart the cycle, or the key operator may press a TRANSFER key whereupon the duplicator controller 12 transfers all of the values, including the write protect bit, if any, from temporary storage to a write buffer in the I/O device 28, and then it serially transfers the entered information to a card 14 which has been inserted in the card reader/writer 34. Upon completion of the write cycle, the system returns to the beginning of the operating cycle.

The invention has now been explained with reference to specific embodiments. Other embodiments will be apparent to those of ordinary skill in the art from this specification. Accordingly, it is not intended that the invention be limited, except as indicated by the appended claims.

What is claimed is:

1. An apparatus for registering magnetic data on a magnetic stripe of a magnetic card insertable in a controller of the type having internal programmed memory, a microprocessor central control unit, input/output means including an output display means and a card reader/writer means and a memory socket means wherein said controller is for supervising accounting and control functions of a vending machine such as a photocopy type duplicator, said controller having no keyboard means for manually accessing said central control unit to modify said magnetic data except by normal vending machine operation, said data registering apparatus comprising:

keyboard means having numerical value input key functions and command input key functions;

means coupled to said keyboard means for interpreting input signals generated by manual operation of said keyboard means and to generate input data;

means coupled to said interpreting means for temporarily storing said data and for transferring said input data in parallel upon receipt of an external signal to a bus means;

bus means coupled to said storing and transferring means;

connector means coupled to said bus means for communicating said data to said memory socket means, said connector means being removably connectable with said memory socket means; and means for signaling connection between said connector means and said memory socket means such that said central control unit is responsive to said generated input data.

2. The apparatus of claim 1 wherein said connection signaling means comprises a connection between a first and a second terminal of said connector means, one of said connector means terminals being functional as a common ground path upon connecting of said connector means with said memory socket means.

3. The apparatus of claim 1 wherein said bus means includes a cable connected to said connector means and wherein said keyboard means and said data storing means are enclosed in a console.

4. A method for registering magnetic data on a magnetic stripe of a magnetic card insertable in a controller for supervising accounting and control functions of a vending machine such as a photocopy type duplicator, said controller having internal programmed memory, a microprocessor central control unit, input/output means including an output display means and a card reader/writer means, and a memory socket means, said controller having no keyboard means for manually accessing said central control unit to modify said magnetic data except by normal vending machine operation, said method comprising:

connecting a card author to said memory socket means, said card author comprising keyboard means, keyboard interpreting means, keyboard input data storage transfer means, and connector means, causing said card author to signal its connection to said central control unit; thereafter causing said central control unit to request data input of a first value indicative of card worth; thereafter keying in first data on said keyboard means; thereafter entering said first data into said memory means causing said central control unit to request data input of a second value indicative of a delimiter; thereafter keying in a second data on said keyboard means; thereafter entering said second data into said memory means;

causing said central control unit to request data input of a third value indicative of a serial number; thereafter keying in third data on said keyboard means; thereafter entering said third data into said memory; thereafter verifying said first, second and third data by displaying said first, second and third data sequentially in said output display means; and thereafter transferring said first, second and third data to a magnetic card in said card reader/writer.

5. The method according to claim 4 further including the steps of:

causing said central control unit to check said first data to determine if it is of the proper type after said first data has been entered into said memory;

causing said central control unit to check said second data to determine if the values represent a valid delimiter; and causing said central control unit to repeat said request steps upon nonverification.

6. The method according to claim 5 further including the steps of:

after said connection signaling stop, causing said central control unit to request data input of a fourth value representative of a card type among three choices, namely, a program card, a master card and a use card;

keying in fourth data on said keyboard means; thereafter entering said fourth data into said memory means; thereafter causing said central control unit to determine if said fourth data is indicative of a master card; and only if so, causing said central control unit to set a write protect bit for such card in said memory.

7. The method according to claim 6 further including the step of causing said central control unit to determine if said fourth data is indicative of a program card; and only if so, causing said central control unit to define program value types such that the designation of said first, said second and said third values are redefined as parametric values.

* * * * *